United States Patent [19]

Gelfand et al.

[11] 4,012,669
[45] Mar. 15, 1977

[54] ELECTRONIC OVERLOAD DETECTING DEVICE

[75] Inventors: Peter C. Gelfand, Lebanon; Clifford A. Mason, Hummelstown, both of Pa.

[73] Assignee: Envirotech Corporation, Menlo Park, Calif.

[22] Filed: Aug. 29, 1975

[21] Appl. No.: 608,865

[52] U.S. Cl. .................. 361/97; 361/98; 361/87
[51] Int. Cl.² .................................. H02H 3/08
[58] Field of Search ............ 317/36 TD, 36, 27 R, 317/33 SC, 33; 328/145, 146, 142, 144, 135, 127; 307/235 N, 235 P

[56] References Cited
UNITED STATES PATENTS

| | | | |
|---|---|---|---|
| 3,531,689 | 9/1970 | Horn | 317/36 R |
| 3,611,164 | 10/1971 | Day | 328/146 X |
| 3,628,160 | 12/1971 | Pickering | 328/144 |
| 3,663,833 | 5/1972 | Pao et al. | 328/144 X |
| 3,697,813 | 10/1972 | Fox | 317/36 TD |
| 3,703,679 | 11/1972 | Heidt | 317/33 VR X |
| 3,849,706 | 11/1974 | Johnson et al. | 317/36 TD X |
| 3,851,259 | 11/1974 | Porawski | 307/235 N |
| 3,916,180 | 10/1975 | Turtle | 328/144 X |

Primary Examiner—J. D. Miller
Assistant Examiner—Patrick R. Salce
Attorney, Agent, or Firm—Robert E. Krebs; Thomas S. MacDonald

[57] ABSTRACT

A device for detecting a persisting electrical overload in an electrical system includes means for monitoring an electrical parameter in the electrical system and for generating an electrical signal whose magnitude represents the instantaneous absolute value of the parameter, reference means which generates an output signal of predetermined value and which develops, in cooperation with the monitoring means, an electrical signal whose magnitude represents the amount by which the magnitude of the absolute value signal exceeds the predetermined value, integrator means to integrate the aforementioned electrical signal and to generate an output whose magnitude includes a component representative of the product of the electrical signal and a time-increasing value that represents the duration that an overload has persisted; and comparator means to continuously compare the magnitude of the integrator output signal with a second preselected value and which generates an indicative output whenever the integrator output signal exceeds the second preselected value.

8 Claims, 3 Drawing Figures

ELECTRONIC OVERLOAD DETECTING DEVICE

BACKGROUND OF THE INVENTION

1. Field of the Invention

This invention relates generally to an electronic device for detecting overload conditions in electrical systems.

2. State of the Art

Currents that exceed the design level of an electrical system (i.e., overloads) may damage the system or its power supply by causing overheating, insulation breakdown, and so forth. Accordingly, it is desirable to have a device which detects an overload condition and which interrupts the current in an electrical system before damage occurs.

A well known type of overload detecting device merely compares the current or voltage in a system with a predetermined standard and commands shutdown whenever the standard is exceeded, even momentarily. Those devices do not accomodate the fact that most systems can withstand momentary or nonpersisting electrical overloads without damage. A device recently suggested in U.S. Pat. No. 3,703,679 permits direct current (DC) overloads to persist for a predetermined time period before interrupting the power supply.

OBJECTS OF THE INVENTION

An object of the present invention is to provide an overload detector which permits electrical overloads to persist for a time dependent upon the magnitude of the overload.

Yet another object is to provide an adjustable overload detector usable in alternating current (AC) electrical systems.

An advantage of the overload detector of this invention is that its sensitivity and time response characteristics are readily adjustable by manual or automatic means.

BRIEF DESCRIPTION OF THE DRAWINGS

The foregoing and other objects and advantages of the present invention can be ascertained from the following detailed description and appended drawings which are offered by way of example only and not in limitation of the invention which is defined by the appended claims and equivalents. In the drawings:

DETAILED DESCRIPTION OF THE INVENTION

Figure 1:
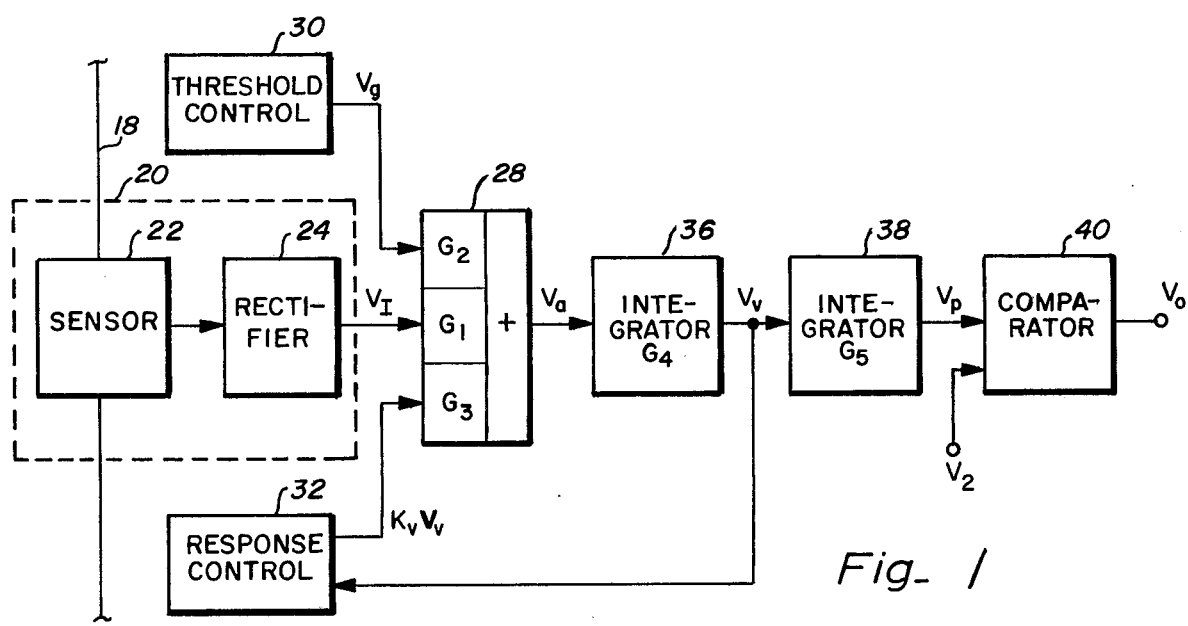
FIG. 1 is a block diagram of the device of the present invention.

In the overload detecting device in FIG. 1, a monitor 20 includes a sensor 22 which is coupled to a power line 18 and to the input of a full-wave rectifier 24. The output of the monitor 20 is a signal $V_I$, called the absolute value signal. Within the monitor 20, a sensor 22 generates an AC signal proportional to the current in the line 18 and that signal is then rectified by rectifier 24 to form a small DC current signal which is the monitor value signal $V_I$.

A noninverting adder 28 is connected to receive the output signal $V_I$ from the monitor 20, a so-called threshold signal $V_g$ from a threshold control 30, and a feedback signal $K_v V_v$ from a response control 32. In practice, the signal $V_g$ is a preselected adjustable value and is of opposite polarity from signal $V_I$. At the input to the adder 28, the signals $V_I$, $V_g$ and $K_v V_v$ are multiplied by gains $G_1$, $G_2$ and $G_3$, respectively. The output of the adder 28 is a signal $V_a$ representative of the sum of the three gain-multiplied input signals.

An inverting integrator 36, having an input gain $G_4$, is connected to receive and integrate the summation signal $V_a$ to thereby produce an output signal $V_v$. The integrated output signal $V_v$ is applied to both the response control 32 and to a second inverting integrator 38, the latter having a gain $G_5$. As will be described hereinafter in detail, the second integrator 38 is initially biased to a value $V_1$ to establish a reference from which all excursions of $V_p$ can be measured. In the response control 32, the signal $V_v$ is multiplied by a preselected constant $K_v$, and then returned to the noninverting adder 28 as the feedback signal $K_v V_v$. The second integrator 38 operates upon the signal $V_v$ to generate an integrated signal $V_p$, called the position signal, which is then applied as an input to a comparator 40, which also receives a reference signal $V_2$. The comparator 40 functions to compare the integrated signal $V_p$ to the reference value $V_2$ and, when $V_p$ is greater than $V_2$, generates an output signal $V_o$ that indicates that an overload condition has occurred The output signal $V_o$ is the output of the overload detector and is used to actuate a switch or the like to shut down the monitored system.

Figure 2:
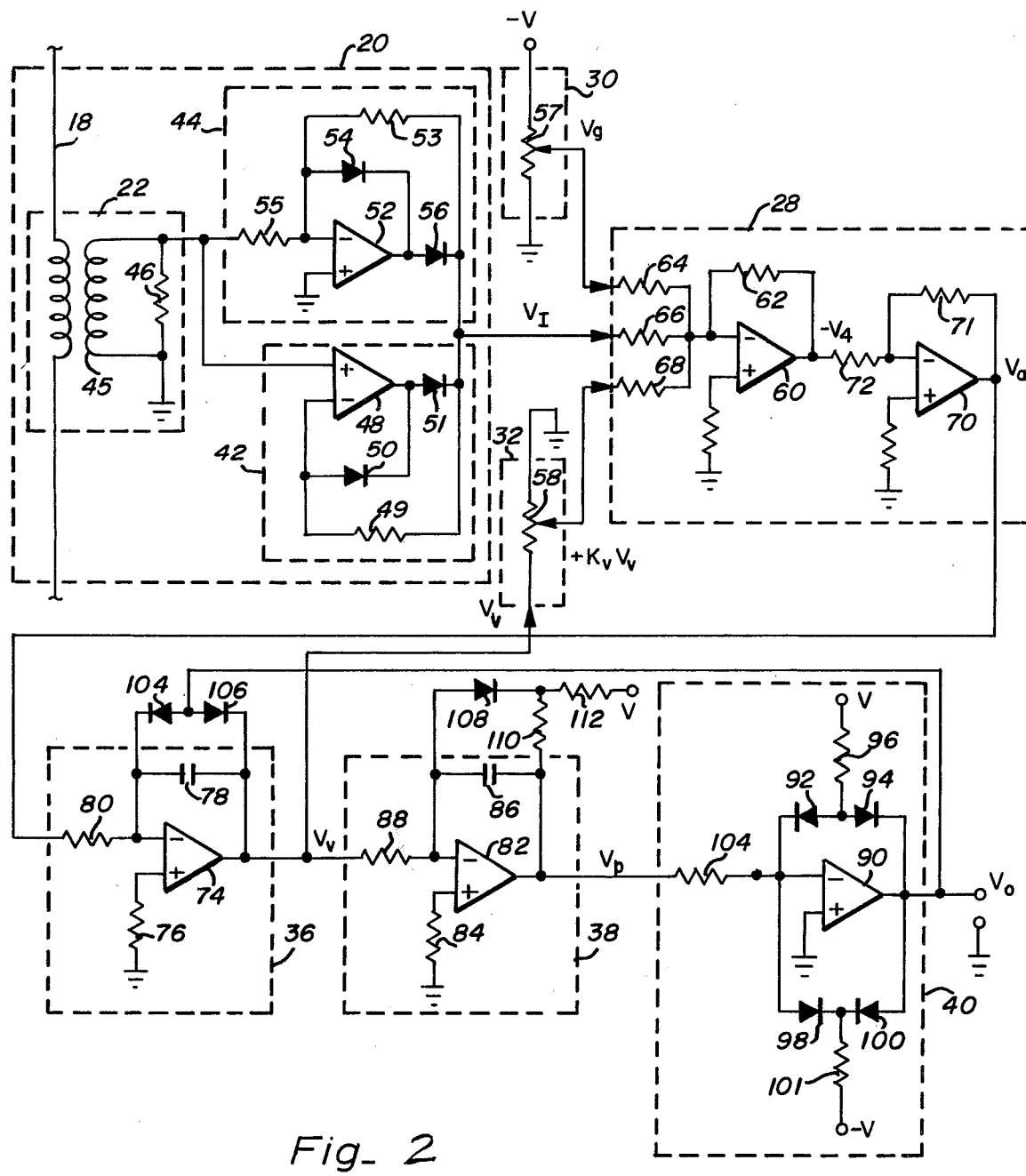
FIG. 2 is a schematic circuit diagram of the preferred embodiment of the device of FIG. 1.

The overload detector of FIG. 2 may also be explained by the following mathematical equations wherein $V_I$ is considered to be a constant signal independent of time. First, the signal $V_a$ can be expressed as:

$$V_a = G_1 V_I + G_2 V_g - G_3 G_4 K_v V_v, \tag{1}$$

where $V_g$ is opposite in polarity to $V_I$. The preceding can be written as a differential equation where $V_a = \dot{V}_v$:

$$\dot{V}_v + G_3 G_4 K_v V_v = G_1 V_I - G_2 V_g. \tag{2}$$

Assuming $V_I$ suddenly changes to a constant value at time $t=0$, it can be shown mathematically that:

$$V_v = \frac{-(G_1 V_I + G_2 V_g)}{G_3 K_v} (1 - e^{-G_3 G_4 K_v 5}) \text{ and that} \tag{3}$$

$$V_a = (G_1 V_I + G_2 V_g) e^{-G_3 G_4 K_v t} \tag{4}$$

as a function of time $t$. Integrating $V_v$ and solving for the initial condition $V_1$ yields:

$$V_p = V_1 + \frac{G_5 (G_1 V_I + G_2 V_g)}{G_3 K_v} \left[ t - \frac{1 - e^{-G_3 G_4 K_v t}}{G_3 G_4 K_v} \right] \tag{5}$$

An overload condition then exists when $V_p - V_2$ 0. That is, when $$(V_2 - V_1)(G_3 K_v/G_5) \approx (G_1 V_I + G_2 V_g)t \tag{6}$$

where the exponential term has been eliminated from the equation on the basis that it is usually a relatively small value. It should be understood that the aforedescribed detector is operable when the signal in the power line 18 is of any complex time-dependent form, but that the preceding equations only hold where $V_I$ is constant over the period of time under consideration.

The interrelationships of the various elements of the overload detector can be readily understood by inspection of the preceding equations. For example, equation (1) shows that the gain $G_1$ determines the effective magnitude of the signal $V_I$ and thus the sensitivity of the overload detector, and that the gain $G_2$ determines the effective magnitude of the signal $V_g$ and thus the threshold for the device. Equation (3) shows that gains $G_3$ and $G_4$ determine the gain of the operating feedback loop and thus the transient response time of the system as expressed by the exponential term. Equation (5) illustrates that gain $G_5$ is a factor in determining the magnitude of the position signal $V_p$ and, hence, affects the time at which an overload condition will be detected. In practice, gains $G_1$ through $G_5$ are predetermined fixed values.

Referring now to equation (6), the term on the left side represents a selected constant value which is called the overload constant. On the right side of the equation, the term $(G_1 V_I + G_2 V_g)$ represents the monitored current in excess of the threshold at any instant of time. The equation indicates that the device will signal an overload when the product of the excess current and the duration $t$ of the excess reaches the preselected overload constant. In other words, the mathematically-described overload device commands shutdown for a constant product of excess current and time.

Referring now to FIG. 2, the sensor 22 of the monitor 20 is illustrated as a current transformer 45 having a high impedance secondary winding in parallel with a resistor 46. The current flowing through the power line 18 produces, via the transformer 45, a proportional AC voltage across the resistor 46. That AC voltage is rectified by networks 42 and 44 to obtain signal $V_I$ which represents a full-wave rectification of the AC input signal. The network 42 comprises an operational amplifier 48, a feedback resistor 49, a clamping diode 50 and an output diode 51. The network 44 comprises an operational amplifier 52, a feedback resistor 53, a clamping diode 54, an input resistor 55 and an output diode 56. When connected in the manner shown, network 42 passes only the positive half cycles of the AC input signals, and the network 44 passes and inverts only the negative half cycles of the AC input signals. The outputs of the networks 42 and 44 are combined through the diodes 51 and 56 to form the signal $V_I$.

The threshold control 30 includes a potentiometer 57 connected between a negative reference voltage ($-V$) and ground. The movable arm of potentiometer 57 allows adjustment of the threshold output signal $V_g$.

The response control 32 includes a potentiometer 58 connected between the output of the integrator 36 and ground. The potentiometer 58 allows selective adjustment of the gain factor $K_v$.

The illustrated noninverting adder 28 generally comprises an inverting adder and an inverter in series. The adder is comprised of an operational amplifier 60, a feedback resistor 62 and input resistors 64, 66, and 68. The aforementioned gains $G_1$, $G_2$, and $G_3$ are established by the ratios of resistance 62 to the resistances 66, 64, and 68 respectively. The inverter, assumed to have a gain of unity, is comprised of an operational amplifier 70, a feedback resistor 71 and an input resistor 72. The inverter reverses the polarity of the summation signal $-V_a$ generated by the operational amplifier 60.

The first integrator 36 comprises an operational amplifier 74 with its positive input connected to ground by a resistor 76, a feedback capacitor 78 and an input resistor 80. The second integrator 38 includes an operational amplifier 82 with its positive input connected to ground by a resistor 84, a feedback capacitor 86 and an input resistor 88.

The comparator 40 is illustrated as a deadband comparator including an operational amplifier 90 with its positive input connected to ground, a pair of diodes 92 and 94 which branch anode-to-anode from a bias resistor 96 connected to a positive constant reference voltage $+V$, a pair of diodes 98 and 100 which branch cathode-to-cathode from a bias resistor 101 connected to a negative constant reference voltage $-V$, and an input resistor 104. The resistances 96, 101, and 104 coact to establish a negative deadband limit $V_3$ and the positive deadband limit which is the aforementioned reference value $V_2$. When $V_p$ is greater than the overload reference $V_2$, the output signal $V_o$ of the comparator 40 saturates at a negative value ($-15V$ in practice) thereby indicating an overload. When $V_p$ is less than the negative limit $V_3$, the output $V_o$ saturates at a positive value ($+15V$ in practice). When $V_p$ is greater than $V_3$ but less than $V_2$, the output $V_o$ is zero.

The output signal $V_o$ of comparator 40 is fed back to a limit circuit, comprised of a pair of diodes 104 and 106 connected anode-to-anode across the capacitor 78 in the integrator 36. Whenever the output $V_o$ is positive, the diodes 104 and 106 are forward biased and force the output of integrator 36 to zero; however, whenever $V_o$ is negative, the limiter has no effect on the integrator 36. In other words, only positive values of $V_a$ will be integrated. The limit circuit serves to set the integrator 36 to an initial state such that each new excursion of the excess current is evaluated from a predefined reference point.

Another limit circuit, comprised of a diode 108 and resistors 110 and 112 connected as shown between a reference voltage $+V$ and the second integrator 38, serves to clamp the signal $V_p$ to the initial condition value $V_1$ when the output of the integrator 74 is zero. (In practice, $V_p$ is actually clamped to a value slightly more negative than $V_1$ to accomodate drift in the electronic components.) This limit circuit insures that each new excursion of excess current will be evaluated from a fixed reference value and is necessary because of the tolerances in the electrical components.

Figure 3:
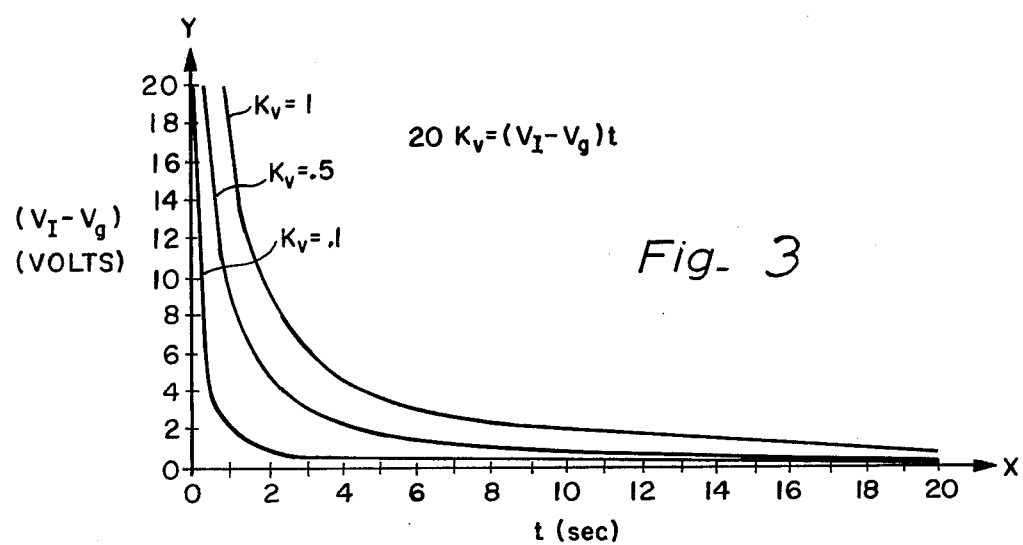
FIG. 3 is a graph depicting response characteristics of the device of FIG. 2.

Referring now to FIG. 3, it will be assumed that the parameters used in the overload detector are $V_2 = 5$, $V_1 = -5$, $G_1$ and $G_2 = 1$, $G_3 = 20$, and $G_4$ and $G_5 = 10$. Substituting those values in equation (6) and simplifying yields:

$$20K_v = (V_I - V_g)t, \text{ for } 0 \leq K_v \leq 1.$$

The preceding equation is graphed in FIG. 3 for values of $K_v$ equal to 1, 0.5 and 0.1. For a given value of excess current $(V_I - V_g)$, one can see from the graph that the time $t$ which expires before the device indicates an overload is directly proportional to the overload constant which, in turn, is a function of $K_v$. A similar family of curves will exist for each different set of values for the parameters in the detector.

Although the detector in FIG. 2 is shown with manually adjustable potentiometers 57 and 58, the detector can be readily modified to allow external electronic control of the parameters $K_v$ and $V_g$ generated by those two devices. For example, the potentiometer 57 can be readily replaced by an external electronic signal source to generate the signal $V_g$. As another example, the potentiometer 58 can be replaced in the circuit by a variable gain amplifier whose gain is proportional to an externally-generated control signal.

One aspect of the aforedescribed device is to establish that an overload condition exists when the product of excess current and time exceeds a certain value, as expressed in equation (6). It should be appreciated that the same result can be obtained in theory by using just a single integration step, or could be obtained without feedback. However, there are difficulties in practicing such modified embodiments with presently available components, especially in high-voltage situations as are encountered, for example, in electrostatic precipitators.

We claim:

1. A device for determining the occurrence of an electrical overload in an electrical system comprising:
   a. means for monitoring an electrical parameter in an electrical system and for generating an output signal representative of the instantaneous absolute value of the monitored electrical parameter;
   b. threshold control means for developing an electrical output signal of predetermined time-invariant value;
   c. adder means connected to receive the output signals from said monitoring means and from said threshold control means and to receive a feedback signal, said adder means being operative to generate an output signal representative of the summation of said three received signals;
   d. integrator means connected to receive said summation signal from said adder means and to generate an output signal representative of the integral of said summation signal;
   e. feedback means coupled between the output of said integrator means and the input to said adder means for feeding said integrated signal back to said adder means with a predetermined gain; and
   f. comparator means connected to receive the integrated signal from said integrator means and operative to generate an indicative overload signal whenever the magnitude of said integrated signal exceeds a second predetermined value.

2. A device for determining the occurrence of an electrical overload in an electrical system comprising:
   a. means for monitoring an electrical parameter in an electrical system and for generating an output signal representative of the instantaneous absolute value of the monitored electrical parameter;
   b. threshold control means for developing an electrical output signal of predetermined value;
   c. adder means connected to receive the output signals from said monitoring means and from said threshold control means and to receive a feedback signal, said adder means being operative to generate an output signal representative of the summation of said three received signals;
   d. first integrator means connected to receive said summation signal from said adder means and to generate an output signal representative of the integral of said summation signal;
   i. feedback means coupled between the output of said integrator means and the input to said adder means for feeding said integrated signal back to said adder means with a predetermined gain;
   f. second integrator means connected to receive said integrated signal from said first integrator means and to generate an output signal representative of the integral of said integrated signal; and
   g. comparator means connected to receive the twice integrated signal from said second integrator means and operative to generate an indicative overload signal whenever the magnitude of said twice integrated signal exceeds a second predetermined value.

3. A device according to claim 2 wherein said predetermined gain of said feeback means is adjustable.

4. A device according to claim 2 wherein said monitoring means comprises a sensor means responsive to the instantaneous value of said monitored parameter and operative to generate therefrom a proportional output signal, and rectifying means connected to receive said proportional output signal and to generate therefrom a rectified signal which is said absolute value signal.

5. A device according to claim 2 wherein said comparator means generates a second output signal when said overload signal is less than said second predetermined value; and first limit circuit means are coupled between said first integrator means and said comparator means to clamp the output of said first integrator to substantially zero whenever said second output signals are received from said comparator means.

6. A device according to claim 4 wherein said rectifying means includes:
   a. a first detector responsive to AC signals in the monitored system and operative to pass only half cycles of one polarity of said AC signals; and
   b. a second detector responsive also the AC signals in the monitored system and operative to pass and invert only half cycles of the other polarity of said AC signals.

7. A device according to claim 5 wherein said comparator means includes:
   a. an operational amplifier connected to receive said twice integrated signal;
   b. a first pair of diodes coupled between the input and the output of said amplifier and joined together anode-to-anode;
   c. a second pair of diodes coupled between the input and the output of said amplifier and joined together cathode-to-cathode;
   d. means for biasing the anode-to-anode devices to a selected positive value to establish said second predetermined value; and
   e. means for biasing the cathode-to-cathode devices to a selected negative value.

8. A device according to claim 2 wherein said predetermined value developed by said threshold control means is adjustable.

* * * * *

UNITED STATES PATENT AND TRADEMARK OFFICE
CERTIFICATE OF CORRECTION

PATENT NO. : 4,012,669
DATED : March 15, 1977
INVENTOR(S) : Peter C. Gelfand, Clifford A. Mason It is certified that error appears in the above-identified patent and that said Letters Patent are hereby corrected as shown below:

Column 2, beginning at line 45 (Equation 3):

In the numerator, please change "$V_i$" to -- $V_I$ --.

In the denominator, please change "$k_v$" to -- $K_v$ --.

Please delete "5" (the last element) and substitute -- t -- therefor.

Column 2, line 54 (Equation 5):

Please insert a period (-- . --) at the end of line.

Column 2, line 57, insert -- ≥ -- before "0".

Signed and Sealed this

First Day of May 1979

[SEAL]

Attest:

RUTH C. MASON
Attesting Officer

DONALD W. BANNER
Commissioner of Patents and Trademarks